March 15, 1960　　　F. B. VAVRINEK　　　2,928,296
DEVICE FOR DEBURRING PARTS CUT FROM TUBULAR STOCK
Filed June 9, 1958　　　　　　　　　　　　　2 Sheets-Sheet 1
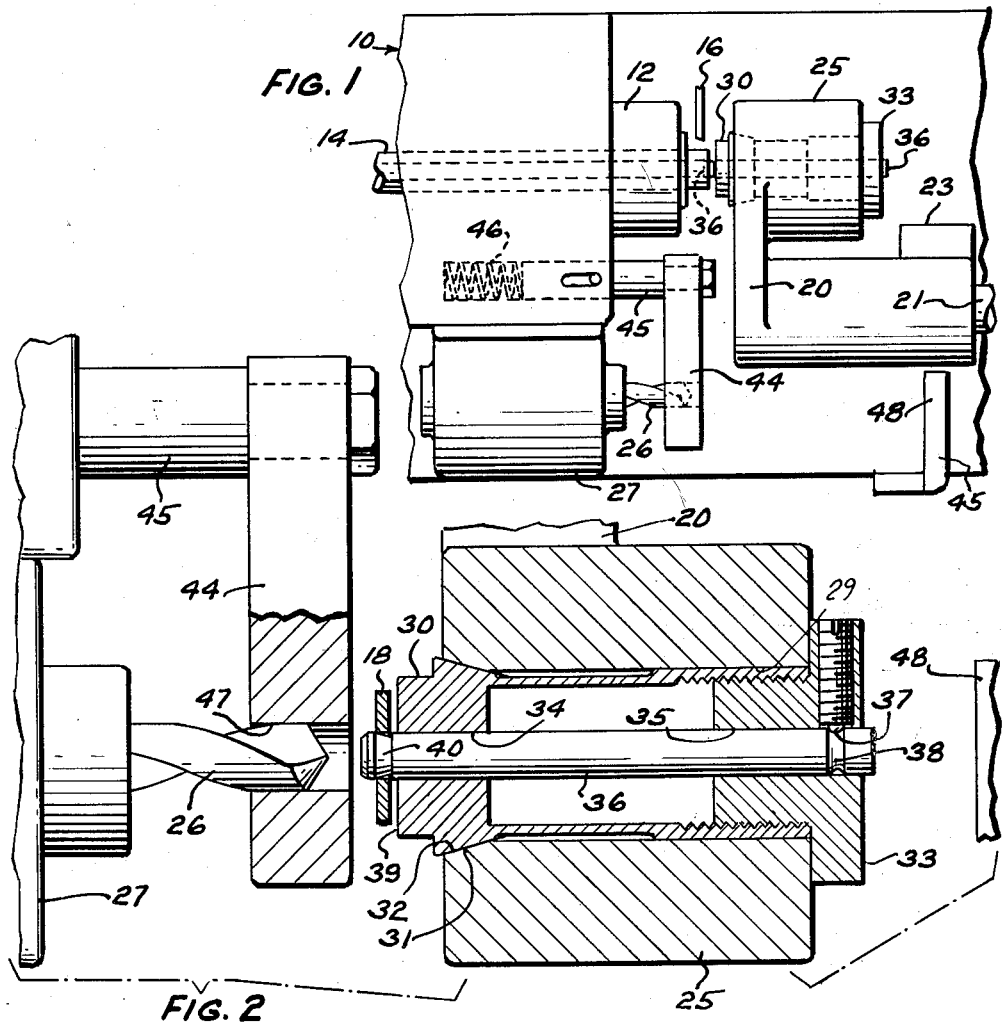
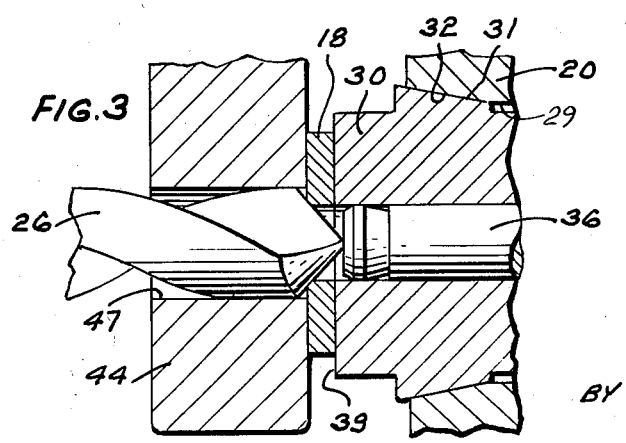
INVENTOR
F.B. VAVRINEK
BY C. S. Hamilton
ATTORNEY March 15, 1960 F. B. VAVRINEK 2,928,296
DEVICE FOR DEBURRING PARTS CUT FROM TUBULAR STOCK
Filed June 9, 1958 2 Sheets-Sheet 2

INVENTOR
F. B. VAVRINEK
BY C. B. Hamilton
ATTORNEY

United States Patent Office 2,928,296
Patented Mar. 15, 1960

2,928,296

DEVICE FOR DEBURRING PARTS CUT FROM TUBULAR STOCK

Frank B. Vavrinek, Downers Grove, Ill., assignor to Western Electric Company, Incorporated, New York, N.Y., a corporation of New York Application June 9, 1958, Serial No. 740,754

9 Claims. (Cl. 77—5)

This invention relates to a device for deburring parts cut from tubular stock and more particularly to a deburring attachment for screw machines for deburring the central portions of washers cut from hollow rod stock.

Difficulty has ben experienced in efficiently deburring the central or apertured portions of washers or other parts cut from tubular stock in screw machines especially when the washers are relatively small and thin. Heretofore, these deburring operations on small, thin washers were performed manually after the washers were removed from the screw machine and required the inspection of the washers to determine which side had to be deburred and then the application of the washers to a deburring tool to remove the burrs therefrom.

An object of the present invention is to provide a device for efficiently deburring annular parts.

Another object of the invention is to provide an attachment for screw machines for automatically deburring the back ends of washers or annular parts cut from tubular stock.

A device illustrating certain aspects of the invention as applied to a screw machine for cutting washers from tubular stock may include a pick-up pin slidably mounted in a pick-up arm of the screw machine which arm is sequentially moved to a pick-up position with the pin aligned with the screw machine spindle and to a deburring position with the pin aligned with a deburring drill, and which arm is reciprocated in the pick up and the deburring positions parallel to the spindle. The forward end of the pin extends from the arm to receive the washer as it is cut off from the stock, and the pin carries the washer to the deburring position as the arm moves thereto.

As the arm moves axially toward the drill, a pressure pad mounted at the deburring position engages the washer and yieldably holds it against the arm and against rotation on the pin and as the movement of the arm continues, the washer is carried into engagement with the rotating drill which pushes the pick-up pin from the washer to a retracted position on the arm and also moves the burrs from the washer. As the arm is moved axially from the drill, the washer is stripped from the drill by the pad and falls into a receptacle, and a stationary stop in the path of the pin returns the pin to its normal position on the arm.

When relatively thick washers are to be cut from the rod stock, the deburring drill is provided with an extension on the end thereof for pushing the pick-up pin from the washer during the deburring operation.

In another embodiment of the invention for deburring washers of relatively small diameter, a collet is mounted on the pick-up arm and has a plurality of spring fingers for engaging the periphery of the washer, and a pick-up pin is slidably supported by the collet in coaxial alignment therewith and with one end of the pin extending from the forward end of the collet for supporting the washer as it is severed from the tubular stock. A sleeve slidably mounted on the pick-up pin within the collet is urged by a spring to a normal forward position with the end thereof flush with the end of the collet for yieldably pressing the washer against the pressure pad and the deburring drill.

As the pick-up arm is moved axially in the deburring position toward the drill, the pressure pad engages the washer and pushes it against the yieldable sleeve and into the collet and then actuates the collet to grip the washer and hold it against rotation while it is moved into engagement with the drill. The drill serves to deburr the washer and to push the pick-up pin therefrom into a retracted position on the pick-up arm, and during the return movement of the arm axially from the drill the collet opens to release the washer and the spring-pressed sleeve ejects it from the collet, and a stationary stop engages the pin and returns it to its normal advanced position on the arm.

Other objects and advantages will become apparent by reference to the following detailed description and the accompanying drawings illustrating several embodiments of the invention, in which:

Fig. 1 is a fragmentary plan view in simplified form of a screw machine with the deburring attachment thereon and showing a pick-up arm in pick-up position for receiving a washer;

Fig. 2 is an enlarged fragmentary view of the device showing the pick-up arm and a washer thereon in a deburring position;

Fig. 3 is a fragmentary view of the device showing the washer in engagement with a deburring tool;

Figure 4:
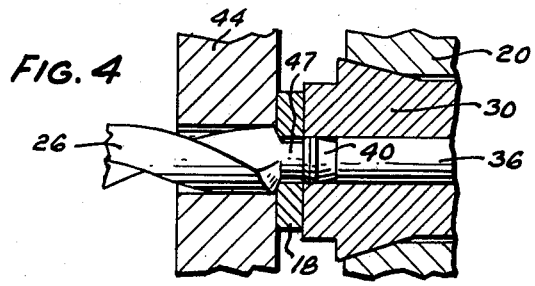
Fig. 4 is a fragmentary view similar to Fig. 3 illustrating a modified embodiment of the deburring tool.

Referring to Fig. 1 of the drawings, there is illustrated in simplified form a screw machine 10 having a spindle 12 for rotating tubular stock 14 and having a cutoff tool 16 for severing washers 18 or other annular parts from the stock. The screw machine also has a pick-up arm 20 which is mounted at one end on a shaft 21 and is actuated by conventional mechanism indicated diagrammatically at 23 for oscillatable movement about the shaft to move the free end 25 of the arm thereof to a pick-up position in alignment with the spindle and to a deburring position in alignment with a deburring tool 26, and for reciprocable movement in an axial direction through a predetermined distance at the pick-up position and the deburring position. The deburring tool 26 is a drill which is rotated by a motor 27 and is supported thereby against axial movement.

The free end 25 of the pick-up arm has an axially disposed aperture 29 therein in which is mounted a cylindrical hollow plug 30 having a conical portion 31 seated on a conforming conical surface 32 on the arm. A flanged retaining cap 33 is threadedly secured to the hollow plug 30 to fixedly secure it onto the arm 20, the plug 30 and cap 33 in effect forming a part of the pick-up arm 20. The plug 30 and the cap 33 have aligned axial bores 34 and 35 for supporting a pick-up pin 36 for slidable movement and with the ends thereof projecting from the plug and the cap. A spring-pressed detent 37 in the plug 30 cooperates with an annular groove 38 in the pick-up pin to yieldably retain the pick-up pin 36 in a normal position with the forward end projecting a predetermined distance from the end surface 39 of the plug 30 for supporting a washer 18 thereon after it has been severed from the tubular stock by the cut-off tool 16. A shallow annular groove 40 formed in the forward end of the pick-up pin 36 aids in retaining the washer thereon.

A pressure pad 44 is supported at the deburring position for movement parallel to the axis of the spindle 12 and the drill 26 by a rod 45 slidably mounted on the screw machine. A spring 46 urges the pad 44 to a normal position as shown in Figs. 1 and 2 and an aperture 47 in the pressure pad provides clearance for the drill 26.

In the operation of forming and deburring washers, the stock 14 is properly positioned in the spindle 12, the arm 20 is moved to its pick-up position with the pin 36 in alignment with the spindle and is then moved axially toward the spindle to its forward position to insert the forward end of the pin into the end of the tubular stock 14 as shown in Fig. 1. A washer 18 is then cut off from the stock 14 and retained on the end of the pick-up pin 36 and is moved axially therewith as the arm 20 returns to its retracted position. As the arm 20 is moved laterally to the deburring position, the washer 18 moves therewith and then moves axially forwardly with the arm 20 toward the drill 26. The washer 18 engages the pressure pad 44 and is gripped thereby against the end surface 39 of the plug 30 and is yieldably held against rotation as the arm 20 continues its forward movement. The pick-up pin 36 engages the end of the drill 26 and is pushed thereby from the washer 18 to a retracted position on the arm 20 as the arm continues its movement to a predetermined forward position and carries the washer 18 into engagement with the drill 26 as shown in Fig. 3 to remove the burrs from the back face thereof.

After the washer 18 has been deburred and as the arm 20 is moved axially from the drill 26 to its retracted position, the pressure pad 44 strips the deburred washer from the drill and when the movement of the pressure pad is arrested as it reaches its normal position and the arm 20 continues its return movement the washer 18 will be released and will drop into a receptacle provided therefor. A stationary stop 48 mounted on the machine in the path of the return movement of the arm 20 at the deburring position engages the pick-up pin 36 and effects movement thereof to its normal position on the arm 20.

When thick washers or annular parts 18 are to be severed from the tubular stock, which are of a thickness sufficient to render the drill 26 ineffective to push the pick-up pin 34 from the washer during the deburring operation, the drill is provided with an extension 47 on the end thereof (Fig. 4) which is adapted to fit within the aperture of the washer 18 and engage the end of the pin 36 and move it from the washer to its retracted position on the arm 20.

Figure 5:
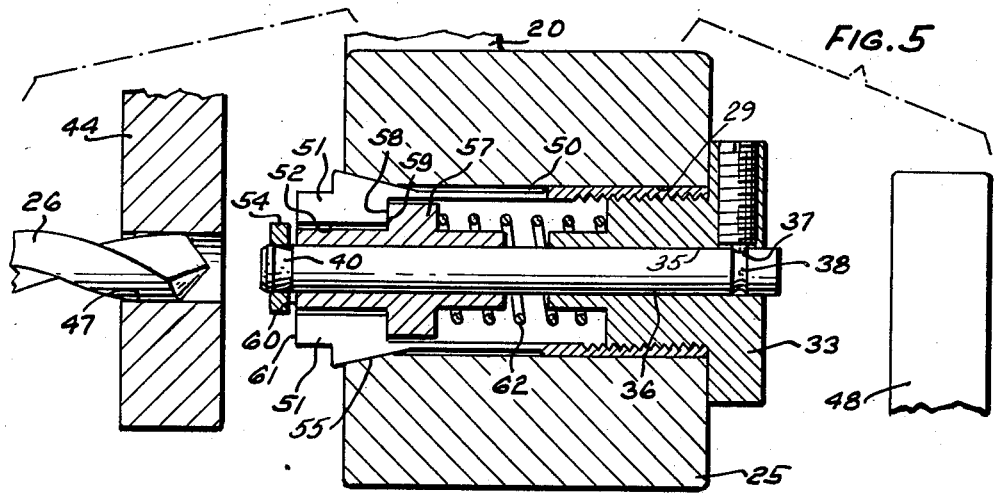
Fig. 5 is a fragmentary view of another embodiment of the device for deburring washers of relatively small diameter and showing the pick-up arm with a washer at the deburring position in spaced relation to the deburring tool.
Figure 6:
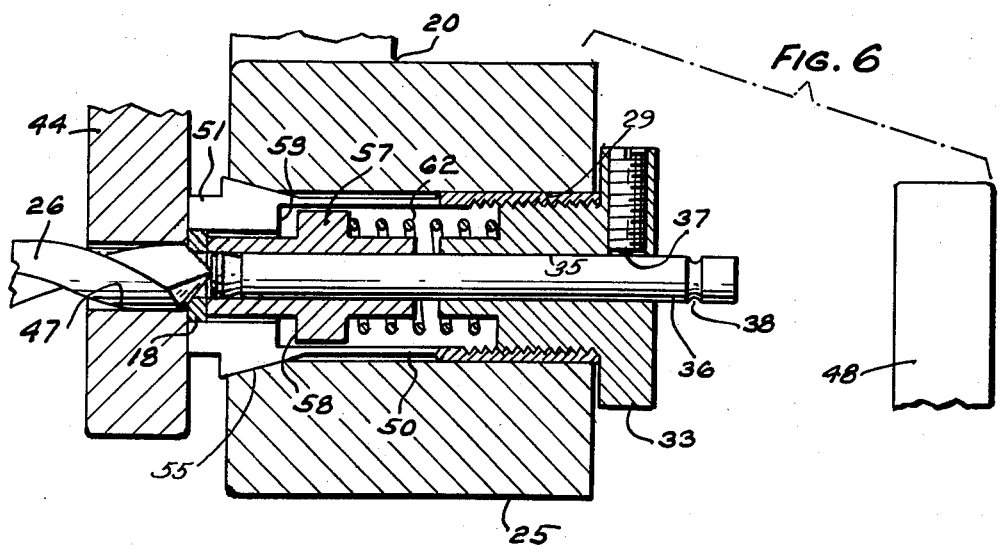
Fig. 6 is a fragmentary view of the deburring device showing some of the parts in a different position with the washers in engagement with the deburring tool.

The modified embodiment of the deburring mechanism illustrated in Figs. 5 and 6 is adapted to deburr washers of relatively small diameter which do not have sufficient areas on opposite faces thereof by means of which they can be effectively gripped between the pressure pad and the pick-up arm to hold them against rotation during the deburring operation. Mounted in the aperture 29 of the pick-up arm 20 is a slotted hollow collet 50 having a plurality of flexible gripping fingers 51 with inner cylindrical surfaces 52 adapted to slide over and grip the outer periphery of a small washer 54. The gripping fingers 51 have conical surfaces 55 seated on the conical surfaces 31 on the arm 20, and the collet is retained on the arm by a threaded cap 33. A pick-up pin 36 is slidably mounted in an aperture 35 of the cap 33 and has a sleeve 57 slidably mounted thereon within the collet. The sleeve 57 has a shoulder 58 engageable with shoulders 59 on the gripping fingers 51 and has an end surface 60 flush with the end surfaces 61 of the collet 50. A spring 62 urges the sleeve to the left to its normal position as shown in Fig. 5.

The operation of picking up a washer 54 cut off from the stock at the pick-up station and carrying it to the deburring station is the same as that previously described. If we assume that the arm 20 and the pick-up pin 36 with a washer 54 thereon is in the deburring position as shown in Fig. 5, then as the arm is advanced toward the deburring drill 26, the washer is carried therewith into engagement with the pressure pad 44 which then effects the movement of the washer 54 and the sleeve 57 within the collet 50 to locate the washer in a position to be gripped by the collet as the arm 20 advances. The collet then engages the pressure pad and is actuated thereby into closed position in gripping engagement with the washer 54 to hold it against rotation. As the arm 20 continues its forward movement, the pressure pad 44 moves along therewith, and the end of the pick-up pin 36 then engages the end of the drill 26 and is moved thereby from the washer 54 into its retracted position on the arm 20, and the washer is moved into engagement with the drill and deburred thereby.

As the arm 20 moves axially away from the drill 26 to its retracted position, the pressure pad 44 moves along with the arm and strips the washer from the drill, and when the pressure pad stops in its normal position, the collet 50 separates therefrom and returns to its normal open position and releases the washer 54. The sleeve 57 is then returned by the spring 62 to its forward position and the washer 54 is ejected thereby from the collet and drops into a receptacle provided therefor. The stop 48 engages the pick-up pin 36 and returns it to its normal position on the arm 20 during the latter portion of the return movement of the arm 20.

It is to be understood that the above-described arrangements are simply illustrative of the application of this invention. Numerous other arrangements may be readily devised by those skilled in the art which will embody the principles of the invention and fall within the spirit and scope thereof.

What is claimed is:

1. In a machine for deburring annular parts, a deburring tool mounted for rotation about a predetermined axis and against axial movement, a member mounted for movement along said axis to and from said tool, means slidably mounted on said member along said axis to a normal position with a portion projecting from the member for supporting a part thereon, and an element yieldably mounted in the path of said member for engaging and pressing the part against the member to hold it against rotation as the part is moved into engagement with the tool, said tool having a projecting end portion to move the projecting portion of said means from the part to a retracted position on the member.

2. In a machine for deburring parts, a deburring tool mounted for rotation about a predetermined axis and against axial movement, a member mounted for movement along said axis to and from said tool, a pin slidably mounted on said member along said axis to a normal position with an end projecting from the member for supporting a part thereon, an element yieldably mounted in the path of said member for engaging and pressing the part against the member and holding it against rotation as the part is moved into engagement with the tool, means for moving the pin from the part to a retracted position on the member, and means for returning the pin on said member to said normal position.

3. In a machine for deburring annular parts, a deburring tool mounted for rotation about a predetermined axis and against axial movement, means for rotating the tool, a member movable along said axis toward and away from said tool, a pin mounted on said member for movement therewith and for movement relative thereto along said axis to a normal first position with one end thereof extending from the member for supporting an annular part thereon, an element yieldably mounted in the path of movement of the member for engaging said annular part and clamping it against said member to hold it against rotation during movement of the part into engagement with the tool, said tool having a projecting end portion to push the pin from said annular part to a retracted position on said member, and means for moving said pin to said normal position on said member in response to movement of said member from the tool.

4. In a machine for deburring annular parts, a drill mounted for rotation about a predetermined axis and against axial movement, means for rotating the drill, a member movable along said axis toward and away from said drill, a pin slidably mounted in said member in coaxial alignment with said drill, means for yieldably retaining said pin on said member in a normal position with one end thereof extending from the member for supporting the annular part thereon, means for reciprocating the member along said axis, a pressure pad yieldably mounted in the path of movement of the member for engaging the annular part and clamping it against said member and against rotation during movement of the part into engagement with the drill, said drill having a projecting end portion to push the pin from said annular part to a retracted position on said member and to deburr said annular part, and means for moving said pin to said normal position on said member in response to movement of said member from the drill.

5. In a machine for deburring annular parts, a tool for deburring said parts mounted for rotation about a predetermined axis and against axial movement, means for rotating said tool, a member movable along said axis toward and away from said tool, a pin slidably mounted on said carrier in coaxial alignment with said axis, means for yieldably retaining said pin on said member in a normal first position with one end thereof extending from the member for supporting the annular part thereon, an element yieldably mounted in the path of movement of the annular part for engaging said part and clamping it against said member and against rotation during the movement of the part into engagement with the tool, said tool having an extension on one end thereof for pushing the pin from said annular part to a retracted position on said member, and means for moving said pin to said normal position on said member in response to movement of said member from the tool.

6. In a machine for deburring relatively small washers, a drill mounted for rotation about a predetermined axis and against axial movement, means for rotating the drill, a member movable along said axis toward and away from said drill, a collet mounted on said member in coaxial alignment with said drill and for movement on the member from a normally open position to a closed position, said collet having resilient gripping fingers projecting from said member for receiving a washer therein and for grippingly engaging the periphery thereof, a pin slidably mounted on said collet in coaxial alignment therewith, means for yieldably retaining said pin in a normal position with an end portion thereof projecting from the collet for supporting a washer thereon, an element mounted for movement parallel to said axis and in the path of movement of the member, resilient means for moving said element to a normal position for engaging the washer on the pin and moving it into the collet and for engaging the collet and actuating it to closed position in gripping engagement with the periphery of the washer in response to movement of the carrier member toward the drill to hold the washer against rotation while it is advanced into engagement with said drill, said drill serving to deburr the annular part and having a projecting end portion to push the pin from the washer to a retracted position on the collet, the resilient fingers of the collet cooperating with the member to move the collet to its normal open position to release the washer in response to disengagement of the collet from the element during the return movement of the member from the drill, a sleeve slidably mounted on the pin, resilient means for moving the sleeve to a normal position relative to the collet to eject the washer from the collet, and a stationary stop engageable with the pin on the return movement of the member from the drill for moving the pin to its normal position in the collet.

7. In a device for deburring annular parts, a drill mounted for rotation about a predetermined axis and against axial movement, means for rotating the drill, a member movable along said axis toward and away from said drill, a collet mounted on said member in coaxial alignment with said axis and for movement relative to the member from a normally open position to a closed position, said collet having resilient gripping fingers projecting from said member for receiving an annular part therein and for grippingly engaging the periphery thereof, a pin slidably mounted in said collet in coaxial alignment therewith, means on said collet for yieldably retaining said pin in a normal position with a portion thereof projecting from one end of the collet for supporting the annular part thereon, an element yieldably mounted in the path of movement of said carrier member for engaging the annular part and moving it into the collet and for engaging the collet and actuating it to closed position in gripping engagement with the periphery of the annular part in response to movement of the carrier member toward the drill, said drill serving to deburr the annular part and having an extension on one end thereof to push the pin from the annular part to a retracted position on the collet, the resilient fingers of the collet cooperating with the member to move the collet to its normal open position to release the annular part in response to disengagement of the collet from the element during the return movement of the carrier member from the drill, means for ejecting the released annular part from the collet, and means engageable with the pin on the return movement of the carrier member from the drill for moving the pin to its normal position in the collet.

8. In a machine for cutting annular parts from tubular stock and having a pick-up member movable along a first path to a first position for receiving the part as it is cut off from the stock and to a second position and reciprocable at said first and said second positions along parallel paths tranversely of said first path, a pick-up pin slidably mounted on said member for movement relative thereto along said parallel paths to a normal position on the member with one end projecting from the member for receiving an annular part at said first position and carrying it to said second position, a tool at said second position for deburring said annular part, means for rotating said deburring tool, means operable in response to movement of said member toward the tool for holding the part onto the member and against rotation while it is being deburred, means for effecting the movement of the pin from the annular part to a retracted position on the member during the movement of the member toward the tool, and means for moving the pin to its normal position on the member in response to movement of the member from said drill.

9. In a machine for cutting annular parts from tubular stock and having a member movable to a first position for receiving a part as it is cut off from the stock and movable to a second position for deburring the part and reciprocable at the first and second positions along paths parallel to the stock, a drill at the second position, a pin slidably mounted on said member for movement relative thereto along said paths to a normal position on the member with an end projecting therefrom for receiving the annular part at said first position and carrying it to said second position, gripping means on said pick-up member engageable with the periphery of the annular part for holding it against rotation, means at the second position for moving said annular part into the gripping means and for actuating said gripping means to grip said annular part in response to movement of said member toward the drill and for releasing said gripping means from the annular part in response to return movement of said member from said drill, said drill having a projecting end portion to push the pin from the annular part to a retracted position on the member during movement of the member toward the drill, means for ejecting the annular part from the gripping means after the part is released from the gripping means, and means for returning the pin to its normal position on the member in response to movement of the member from said drill.

References Cited in the file of this patent

UNITED STATES PATENTS

| | | |
|---|---|---|
| 518,803 | Bohm | Apr. 24, 1894 |
| 1,752,468 | Stull | Apr. 1, 1930 |
| 1,859,111 | Rock | May 17, 1932 |
| 1,961,868 | Staubo | June 5, 1934 |
| 2,301,151 | Spievak | Nov. 3, 1942 |